(12) United States Patent
Azra et al.

(10) Patent No.: US 12,319,800 B2
(45) Date of Patent: Jun. 3, 2025

(54) FABRICATION OF REINFORCED ANION EXCHANGE MEMBRANES

(71) Applicant: HYDROLITE LTD, Caesarea (IL)

(72) Inventors: Charly David Azra, Harish (IL); Yauhen Akayeu, Haifa (IL); Amiram Sisso, Or Akiva (IL)

(73) Assignee: HYDROLITE LTD, Caesarea (IL)

( * ) Notice: Subject to any disclaimer, the term of this patent is extended or adjusted under 35 U.S.C. 154(b) by 0 days.

(21) Appl. No.: 18/611,853

(22) Filed: Mar. 21, 2024

(65) Prior Publication Data

US 2024/0317952 A1     Sep. 26, 2024

(30) Foreign Application Priority Data

Mar. 21, 2023 (IL) .......................................... 301557

(51) Int. Cl.
*C08J 5/22* (2006.01)
*B01D 67/00* (2006.01)
(Continued)

(52) U.S. Cl.
CPC ........ *C08J 5/2287* (2013.01); *B01D 67/0006* (2013.01); *B01D 69/02* (2013.01);
(Continued)

(58) Field of Classification Search
CPC ... C08J 5/2287; C08J 3/005; C08J 3/24; C08J 7/123; C08J 2323/06; C08J 2327/04;
(Continued)

(56) References Cited

U.S. PATENT DOCUMENTS

2018/0201746 A1* 7/2018 Hessing ............... C08K 5/0025
2021/0108067 A1   4/2021 Bae et al.
(Continued)

FOREIGN PATENT DOCUMENTS

CN          111244512 A   *   6/2020  ......... H01M 8/1048
WO    WO2019097527       5/2019
(Continued)

OTHER PUBLICATIONS

CN_111244_MT (Year: 2020).*
(Continued)

*Primary Examiner* — Alexander Usyatinsky
(74) *Attorney, Agent, or Firm* — PEARL COHEN ZEDEK LATZER BARATZ LLP

(57) ABSTRACT

Methods of preparing reinforced anion exchange membranes are provided, as well as produced membranes and corresponding devices utilizing the membranes. Methods comprise compounding a halide-functionalized polymer (selected to react with amines to yield anion-conducting quaternary amine groups) with thermoplastic polymer(s) (selected to support and/or reinforce the membrane), and with copolymer(s) (selected to enhance the compounding of the polymers)—by heating, mixing and cooling—to form blend pellets, extruding the blend pellets to form a blend film, cross-linking polymer(s), and functionalizing the blend film to prepare the anion exchange membrane. Functionalization comprises a quaternization step comprising reacting halogen groups of the first polymer with tertiary amines to produce the quaternary amine groups with ion-exchange functionality. Reinforced anion exchange membranes are provided, which are produced by the disclosed methods, functionalized to yield a membrane for fuel cell(s), electrolyzer(s), reversible electrochemical device(s), desalination unit(s), etc.

35 Claims, 3 Drawing Sheets

(51) Int. Cl.

| | |
|---|---|
| *B01D 69/02* | (2006.01) |
| *B01D 71/26* | (2006.01) |
| *B01D 71/28* | (2006.01) |
| *B01D 71/78* | (2006.01) |
| *B01J 41/05* | (2017.01) |
| *B01J 41/14* | (2006.01) |
| *B01J 47/12* | (2017.01) |
| *C02F 1/46* | (2023.01) |
| *C08J 3/00* | (2006.01) |
| *C08J 3/24* | (2006.01) |
| *C08J 7/12* | (2006.01) |
| *C25B 13/08* | (2006.01) |
| *H01M 8/0221* | (2016.01) |

(52) U.S. Cl.
CPC ............ *B01D 71/26* (2013.01); *B01D 71/281* (2022.08); *B01D 71/78* (2013.01); *B01J 41/05* (2017.01); *B01J 41/14* (2013.01); *B01J 47/12* (2013.01); *C02F 1/4604* (2013.01); *C08J 3/005* (2013.01); *C08J 3/24* (2013.01); *C08J 7/123* (2013.01); *C25B 13/08* (2013.01); *H01M 8/0221* (2013.01); *B01D 2323/081* (2022.08); *B01D 2323/30* (2013.01); *B01D 2323/385* (2013.01); *B01D 2323/60* (2022.08); *B01D 2325/42* (2013.01); *C08J 2323/06* (2013.01); *C08J 2327/04* (2013.01); *C08J 2353/02* (2013.01); *C08J 2423/06* (2013.01); *C08J 2427/04* (2013.01); *C08J 2453/02* (2013.01)

(58) Field of Classification Search
CPC ................ C08J 2353/02; C08J 2423/06; C08J 2427/04; C08J 2453/02; B01J 41/05; B01J 41/14; B01J 47/12; B01D 71/281; B01D 67/0006; B01D 69/02; B01D 71/26; B01D 71/78; B01D 2323/081; B01D 2323/60; B01D 2323/30; B01D 2323/385; B01D 2325/42; C02F 1/4604; C25B 13/08; H01M 8/0221

See application file for complete search history.

(56) References Cited

U.S. PATENT DOCUMENTS

2022/0384833 A1* 12/2022 Li ............................ B01J 47/12
2023/0407023 A1* 12/2023 Agonigi ................. C08J 5/2287

FOREIGN PATENT DOCUMENTS

| WO | WO2021204890 | 10/2021 | |
|---|---|---|---|
| WO | WO 20220905 | * | 6/2022 |

OTHER PUBLICATIONS

Mokrini et al. Journal of Membrane Science 283 (2006) 74-83 (Year: 2006).*

Written opinion of the international searching authority for PCT/IL2024/050285 (Year: 2024).*

Wang et al. "Radiation-grafted anion-exchange membranes: the switch from low- to high-density polyethylene leads to remarkably enhanced fuel cell performance", Energy & Environmental Science 12:1575-1579, 2019.

Mokrini et al. "Non-fluorinated proton-exchange membranes based on melt extruded SEBS/HDPE blends", Journal of Membrane Science 325: 749-757, 2008.

Mokrini A, Huneault MA. "Proton exchange membranes based on PVDF/SEBS blends", Journal of power sources. Mar. 9, 2006;154(1):51-8.

Mokrini A, Huneault MA, et al. "Partially fluorinated proton exchange membranes based on PVDF-SEBS blends compatibilized with methylmethacrylate block copolymers", Journal of membrane science. Oct. 20, 2006; 283(1-2): 74-83.

* cited by examiner

FABRICATION OF REINFORCED ANION EXCHANGE MEMBRANES

CROSS REFERENCE TO RELATED APPLICATIONS

This application claims priority from Israeli Patent Application No. 301,557, filed on Mar. 21, 2023, which is incorporated herein by reference in its entirety.

BACKGROUND OF THE INVENTION

1. Technical Field

The present invention relates to the field of anion exchange membranes, and more particularly, to fabrication methods thereof.

2. Discussion of Related Art

WIPO Publication No. 2019097527, which is incorporated herein by reference in its entirety, teaches a membrane for fuel cells, such as proton exchange membrane (PEM) and/or anion exchange membrane (AEM) fuel cells and/or electrolyzers that may include: crosslinked ionomer comprising two types of functional groups: a first type of functional groups forming crosslinking bonds between two ionomer chains; and a second type of functional groups comprising ion conducting functional groups. In some embodiments, the crosslinking bonds may not include the ion conducting functional groups.

Wang et al. 2019 (Radiation-grafted anion-exchange membranes: the switch from low- to high-density polyethylene leads to remarkably enhanced fuel cell performance, Energy & Environmental Science 12:1575-1579), which is incorporated herein by reference in its entirety, teaches a high-density polyethylene-(HDPE)-based radiation-grafted anion-exchange membrane (RG-AEM) that achieves a high peak power density and a low in situ degradation rate (with configurations tailored to each), which can be successfully paired with an exemplar non-Pt-group cathode.

Mokrini et al. 2008 (Non-fluorinated proton-exchange membranes based on melt extruded SEBS/HDPE blends, Journal of Membrane Science 325: 749-757), which is incorporated herein by reference in its entirety, teaches functional polymer blends prepared by melt-processing technologies for proton-exchange membrane (PEM) applications. Styrene-ethylene/butylene-styrene (SEBS) and high-density polyethylene (HDPE) were melt blended using twin-screw compounding, extruded into thin films by extrusion-calendaring. The films were then grafted with sulfonic acid moieties to obtain ionic conductivity leading to proton-exchange membranes.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of preparing a reinforced anion exchange membrane, the method comprising: (i) compounding a first polymer with at least one second polymer and at least one third polymer by heating, mixing and cooling—to form blend pellets, (ii) extruding the blend pellets to form a blend film, wherein the first polymer is optionally grafted with the at least one second polymer or the at least one third polymer during the extrusion, (iii) cross-linking at least one of the polymers during the compounding and/or during the extrusion and/or after the extrusion, and (iv) functionalizing the blend film to prepare the anion exchange membrane; wherein: (i) the first polymer comprises a halide-functionalized polymer selected to react with amines to yield anion-conducting quaternary amine groups, wherein the halogen is chlorine, bromine or iodine, and not fluorine, (ii) the functionalizing comprises a quaternization step comprising reacting halogen groups of the first polymer with tertiary amines to produce quaternary amine groups providing an ion-exchange functionality to the membrane, (iii) the at least one second polymer comprises at least one thermoplastic polymer selected to support and/or reinforce the membrane, and (iv) the at least one third polymer comprises a copolymer selected to enhance the compounding of the first polymer and the at least one second polymer.

The cross-linking may be carried out with respect to at least one of the polymers and/or with respect to at least two of the polymers, in non-limiting examples the cross-linking may be applied to (i) the at least one second polymer during or after the compounding to form an inter-penetrating network of the cross-linked second polymer, (ii) the at least one second polymer and/or the at least one third polymer during or after the compounding to form an inter-penetrating network of the cross-linked second and/or third polymer, and/or (iii) the first polymer during or after the compounding to form an inter-penetrating network of the cross-linked first polymer.

One aspect of the present invention provides a method of preparing a reinforced anion exchange membrane, which comprises compounding PVBC (poly(vinylbenzyl chloride)) or a copolymer thereof with at least one thermoplastic polymer and at least one SEBS (styrene-ethylene-butadiene-styrene) and/or modified SEBS—by heating, mixing and cooling—to form blend pellets, extruding the blend pellets to form a blend film, wherein the PVBC or copolymer thereof is grafted with the at least one SEBS and/or modified SEBS during the extrusion, cross-linking the PVBC or copolymer thereof with the at least one thermoplastic polymer during the compounding and/or during the extrusion and/or after the extrusion, and functionalizing the blend film to prepare the anion exchange membrane.

Some aspects of the present invention provide the blend pellets formed by the compounding stage, the blend films formed by the extrusion stage, and/or reinforced anion exchange membrane produced by the disclosed methods, functionalized to yield a membrane for various types of fuel cell(s), electrolyzer(s), reversible electrochemical device(s), desalination unit(s), electrodialysis device(s), synthesizing device(s), etc.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

Figure 1A:
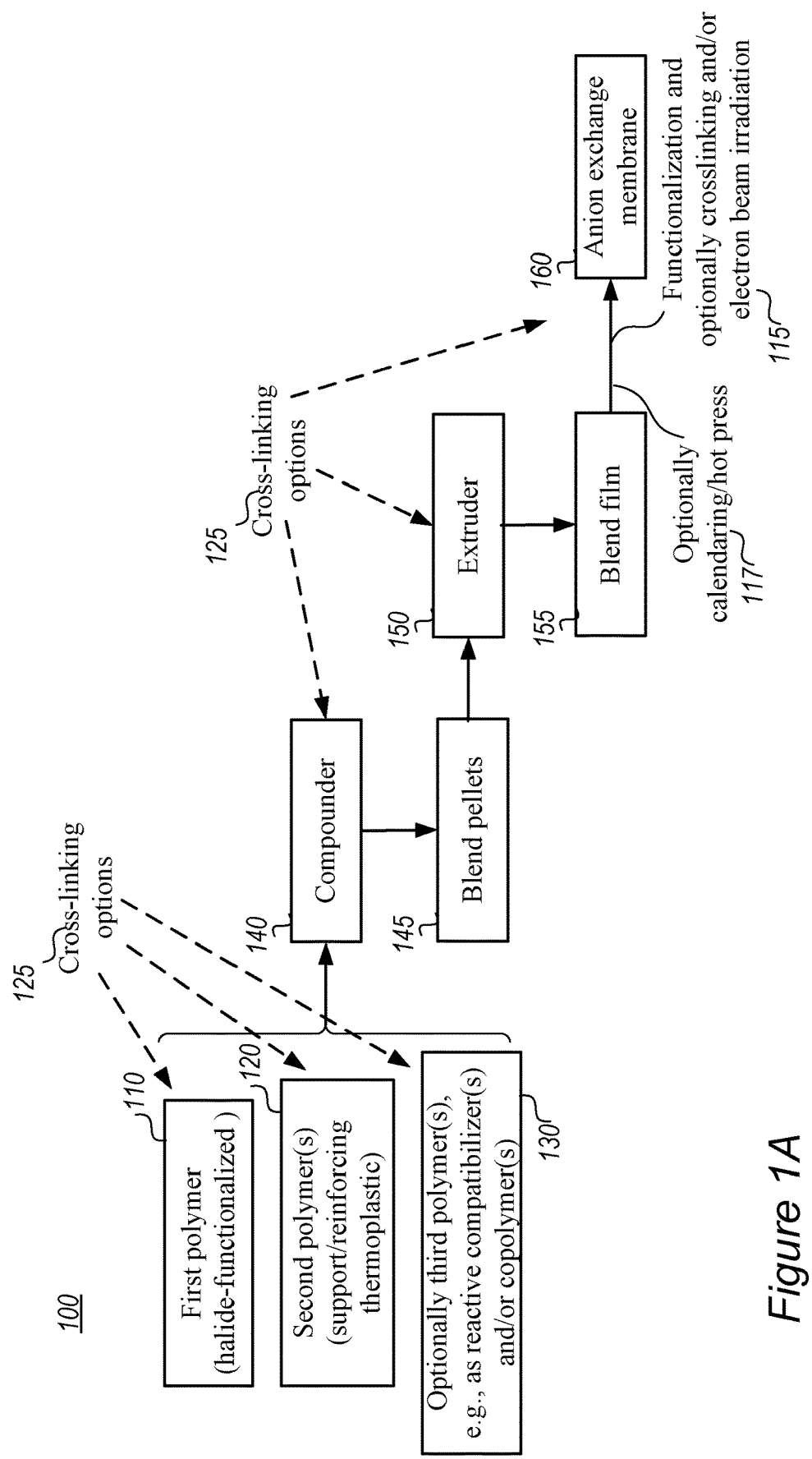
FIGS. 1A and 1B are high-level schematic illustrations of systems for preparing reinforced anion exchange membranes, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for producing robust, inexpensive and optionally large, reinforced anion exchange membrane and thereby provide improvements to technological fields that utilize anion exchange membranes, such as electrochemical devices, electrodialysis devices, synthesizing devices, and desalination units.

Methods of preparing reinforced anion exchange membranes are provided, as well as produced membranes and corresponding alkaline or anion exchange membrane (AEM) devices utilizing the membranes. Methods comprise compounding a halide-functionalized polymer (selected to react with amines to yield anion-conducting quaternary amine groups) with thermoplastic polymer(s) (selected to support and/or reinforce the membrane), and with copolymer(s) (selected to enhance the compounding of the polymers)—by heating, mixing and cooling—to form blend pellets, extruding the blend pellets to form a blend film, cross-linking polymer(s), and functionalizing the blend film to prepare the anion exchange membrane. Functionalization comprises a quaternization step comprising reacting halogen groups of the first polymer with tertiary amines to produce the quaternary amine groups with ion-exchange functionality. Reinforced anion exchange membranes are provided, which are produced by the disclosed methods, functionalized to yield a membrane for fuel cell(s), electrolyzer(s), reversible electrochemical device(s), desalination unit(s), etc.

Various embodiments include materials and processes for the fabrication of anion-exchange membranes for electrochemical applications, particularly alkaline or anion exchange membrane (AEM) devices, polymeric blends for extrusion-based, or other melt-based fabrication of anion-exchange membranes, as well as blends of poly(vinylbenzyl chloride) (PVBC), copolymers of VBC and/or other monomers like styrene, ethylene, propylene, butylene, butadiene, isoprene and/or other co-monomers, and optionally polyolefins—for extrusion-based fabrication of anion-exchange membranes, materials and (melt/extrusion) processes for making interpenetrating networks (IPNs) of one or more of these polymers for anion exchange membrane fabrication and in-situ mesh reinforcement methods for polymer blends produced by extrusion methods.

Figure 1B:
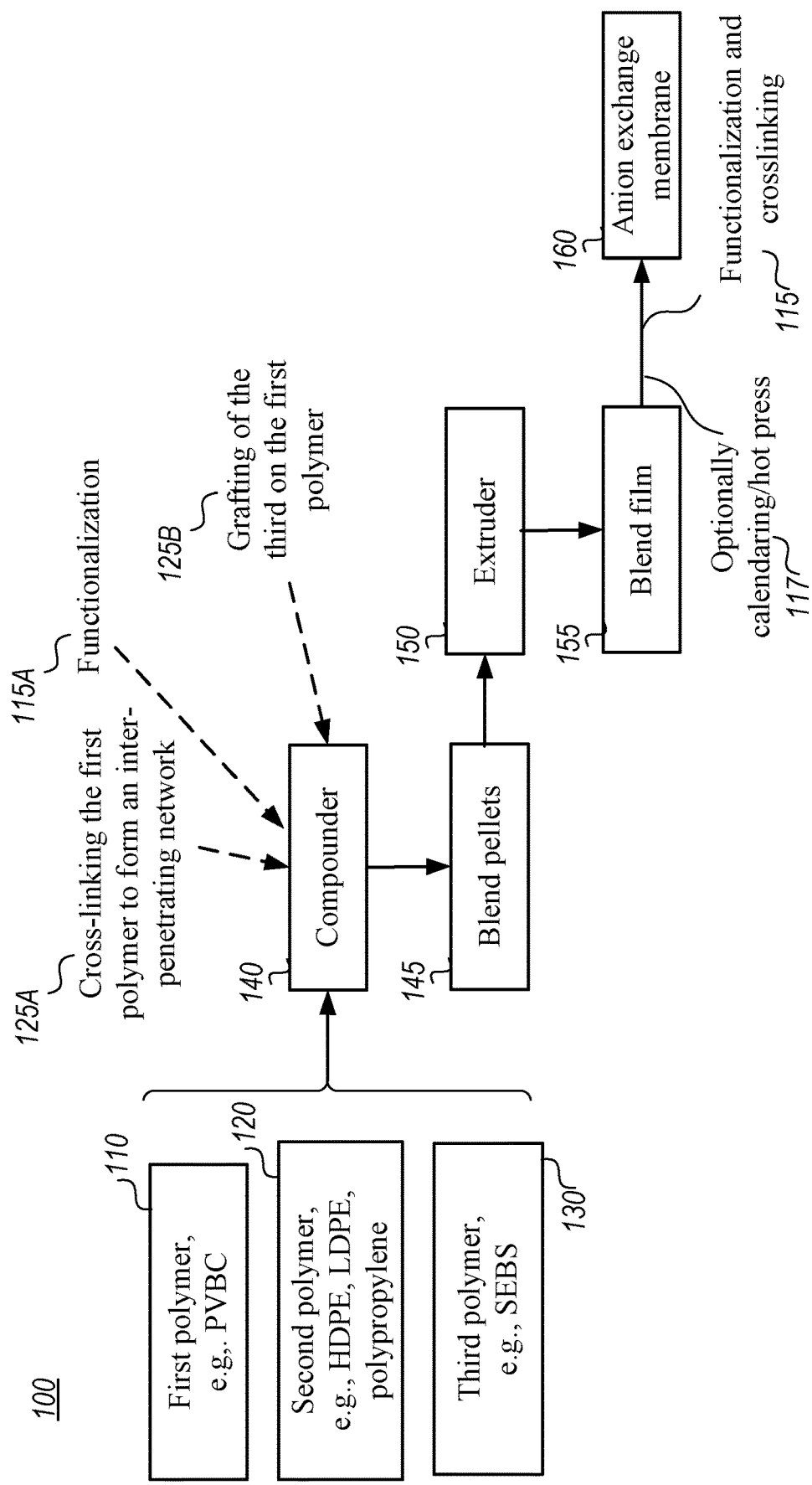
Figure 2:
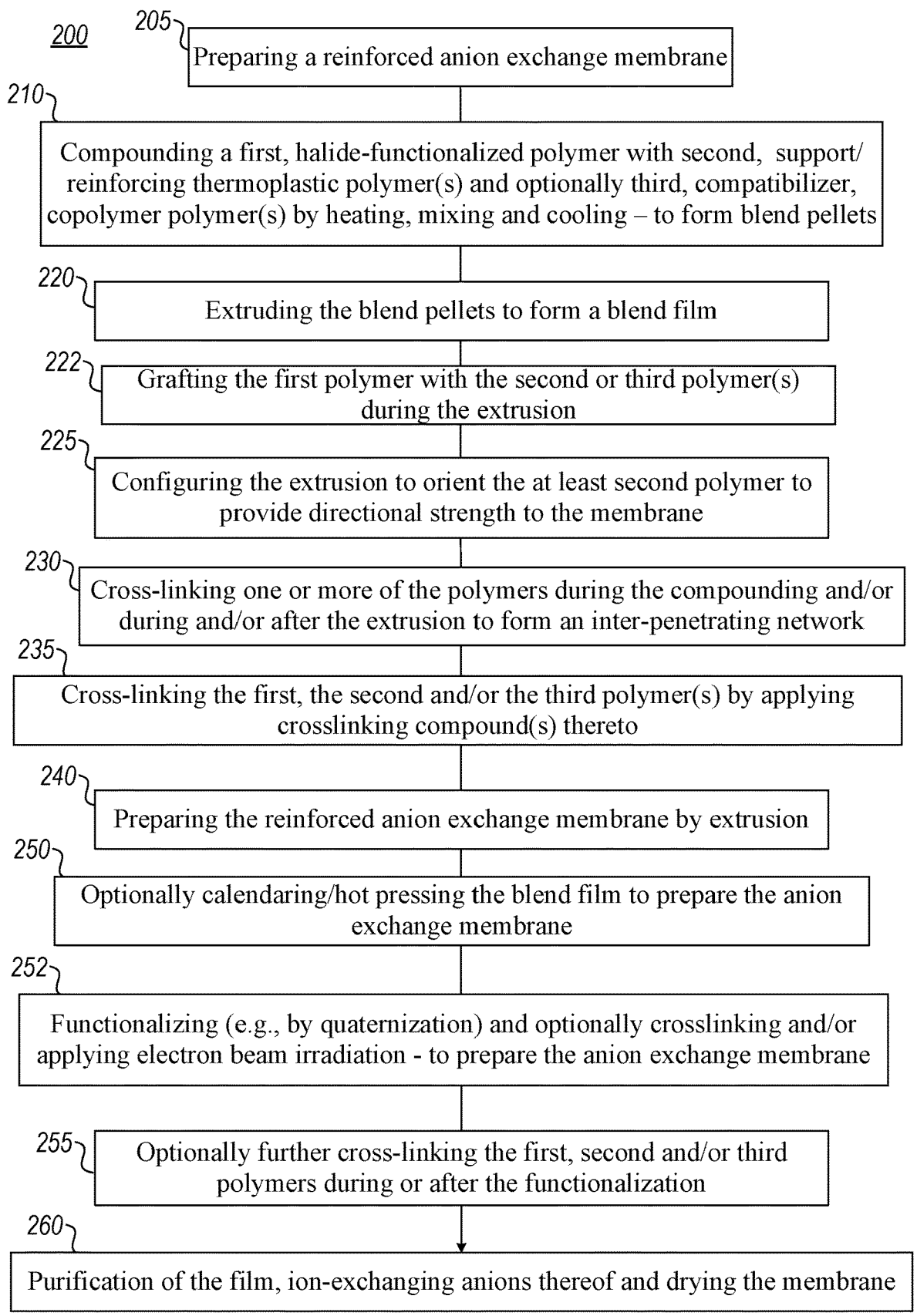
FIG. 2 is a high-level flowchart illustrating methods of preparing a reinforced anion exchange membrane, according to some embodiments of the invention.

FIGS. 1A and 1B are high-level schematic illustrations of systems 100 for preparing a reinforced anion exchange membrane 160, according to some embodiments of the invention. FIG. 2 is a high-level flowchart illustrating a method 200 of preparing a reinforced anion exchange membrane, according to some embodiments of the invention. The method stages may be carried out with respect to system 100 described above, which may optionally be configured to implement method 200. Method 200 may comprise the following stages, irrespective of their order. Elements from FIGS. 1A, 1B and 2 may be combined in any operable combination, and the illustration of certain elements in certain figures and not in others merely serves an explanatory purpose and is non-limiting.

As illustrated schematically in FIG. 1A and demonstrated by method 200, a reinforced anion exchange membrane 160 may be prepared (stage 205) by compounding a first polymer 110 with at least one second polymer 120 and optionally at least one third polymer 130 by heating, mixing and cooling—to form blend pellets (stage 210), e.g., in a compounder 140 forming blend pellets 145; extruding the blend pellets to form a blend film (stage 220), e.g., in extruder 150 forming blend film 155; cross-linking at least one of the polymers during the compounding and/or during and/or after the extrusion (stage 230), e.g., implementing cross-linking 125 at one or more of the production stages; optionally calendaring and/or hot pressing the blend film (stage 250) and functionalizing the blend film to prepare the anion exchange membrane (stage 252), e.g., optionally applying electron beam irradiation (to create crosslinks in the second polymer), implementing functionalization and optionally chemical crosslinking 115 and optionally calendaring/hot pressing 117 to form reinforced anion exchange membrane 160. In various embodiments, calendaring and/or hot pressing may be carried out before the functionalizing (e.g., amination) and/or the crosslinking.

It is noted that compounder 140 may comprise a twin-screw extruder to provide the necessary shear mixing needed to mix highly viscous polymer melts and form pellets of the blend. Extruder 150 may comprise a blown-film extruder or a cast film extruder as usually used in the plastic industry for film production, including the usual devices and machinery to form, cool down and wind the film into a roll.

First polymer 110 may comprise a halide-functionalized polymer selected to react with amines to yield anion-conducting quaternary amine groups. The halogens that may be used to functionalize first polymer 110 may comprise chlorine, bromine or iodine, but not fluorine, which does not allow forming quaternary amine group. The halogen-containing groups in first polymer 110 may be selected to enable controllable nucleophilic substitution (also called displacement) by tertiary amines to produce quaternary ammonium groups, e.g., during functionalization.

For example, as illustrated schematically in FIG. 1B as a non-limiting example, first polymer 110 may comprise comprises PVBC (poly(vinylbenzyl chloride) or a copolymer thereof, such as styrene-VBC copolymer. In various embodiments, first polymer 110 may comprise copolymers of VBC and monomers like styrene, ethylene, propylene, butylene, butadiene, isoprene and/or acrylonitrile. Typically, the chloride anion may be replaced after the functionalization with other anions, according to the operation requirements of membrane 160, e.g., any of $OH^-$, $CO_3^{2-}$, $HCO_3^-$, $Cl^-$ itself (possibly without or with limited ion exchange with respect to PVBC), $Br^-$, $I^-$, $NO_3^-$, sulfates, phosphates, carboxylates etc. Molecular weights for PVBC and/or other VBC-containing copolymers may be between 30 and 500 kDa, e.g., within any of the ranges 30-500 kDa, 50-300 kDa, 50-200 kDa, 100-200 kDa, 100-400 kDa or any intermediate range.

Second polymer(s) 120 may comprise at least one thermoplastic polymer selected to support and/or reinforce the membrane. For example, second polymer(s) may comprise at least one polyolefin such as polyethylene (e.g., ULDPE-ultra low density polyethylene, VLDPE-very low density polyethylene, LDPE-low density polyethylene, LLDPE-linear low-density polyethylene, MDPE-medium-density polyethylene, HDPE-high-density polyethylene (as illustrated schematically in the non-limiting example of FIG. 1B), UHMWPE-ultra-high-molecular-weight polyethylene), plastomers, polypropylene as homopolymer and/or copolymer, polybutene, polyisobutylene, polymethylpentene, cylic olefin polymers (COP), cyclic olefin copolymers (COC), etc. In certain embodiments, second polymer(s) may comprise at least one polymer which is not a polyolefin, such as, e.g., polyphenylene oxide (PPO), polyurethane (PU), polyvinylbutyral (PVB). Any of the second polymer(s) may be modified, e.g., aminated or hydroxylated, for example, second polymer(s) may comprise aminated or otherwise modified PE, such as modified LDPE.

Third polymer(s) 130 may comprise copolymer(s) selected to have a good miscibility with first polymer 110 and with second polymer(s) 120, respectively—to enhance the compounding thereof. For example, third polymer(s) may comprise at least one styrenic copolymers such as SEBS (poly(styrene-ethylene-butadiene-styrene)), acid-modified SEBS, anhydride-modified SEBS, amine-modified SEBS, SEPS (poly(styrene-ethylene-propylene-styrene)), SBS (poly(styrene-butadiene-styrene)), SIS (poly(styrene Isoprene styrene)), SBBS (poly(styrene-b-butadiene-co-butylene-b-styrene)), ABS (poly(acrylonitrile butadiene styrene), at least one ethylene copolymers and/or modified polyethylene such as ethylene-propylene diene monomer (EDPM), ethylene-norbornene copolymer, ethylene-octene copolymer, ethylene acrylic acid copolymer, poly(ethylene-graft-maleic anhydride), ethylene vinyl acetate copolymer, ethylene vinyl alcohol copolymer. Any of the third polymer (s) may be modified, e.g., aminated or hydroxylated, for example, third polymer(s) may comprise aminated or otherwise modified SEBS, SEPS or SBS. In certain embodiments, the third polymer(s) may comprise reactive and unreactive (e.g., modified and unmodified) copolymer(s), e.g., both reactive and unreactive SEBS as a non-limiting example.

In various embodiments, second polymer(s) and/or third polymer(s) may be selected to contain reactive functional unit(s) such as amine(s) or hydroxyl group(s), selected to react with the at least one first polymer at the compounding step and/or at the extrusion step, thus forming a graft copolymer of third polymer(s) onto first polymer(s). At high concentration of reactive second polymer(s) and/or reactive third polymer(s), these polymer(s) may form crosslinking to the first polymer. Within certain ranges, light crosslinking does not hinder processing of the film while enhancing compatibility with second polymer(s) and adding mechanical properties such as strength and/or robustness. In non-limiting examples, PVBC as the first polymer may be grafted/crosslinked with one or more reactive types of PE as the second polymer(s) and/or reactive SEBS (or modified SEBS, e.g., amine-modified SEBS) as the third polymer(s). Grafting may be carried out using small ratios between the number of polymer chains of the reactive second/third polymers and the first polymer, while crosslinking may be carried out using larger ratios.

Compounding 210 may be carried out within a temperature range for the melt of 120-350° C., 150-270° C., or within sub-ranges thereof.

In various embodiments, first polymer 110 may be grafted with second polymer(s) 120 or the third polymer(s) 130 during the extrusion (stage 222), e.g., grafting (125B) third polymer 130 on first polymer 110—as illustrated schematically in the non-limiting example of FIG. 1B. Specifically, grafting (125B) of PVBC as first polymer 110 with amine modified SEBS as third polymer 130 during compounding was found to yield reactive compatibilization of the blend (in addition to cross-linking 125A that forms the interpenetrating network of PVBC)—which further enhances the stability of the extruded membrane. Advantageously, grafting allows for enhanced compatibilization of PVBC with polyolefin by chemically attaching SEBS to PVBC hence reducing significantly de-mixing and phase separation after the quaternization step. Chemically attaching SEBS to PVBC by grafting, as opposed to physical interaction only, overcomes the tendency of PVBC to separate, after it becomes highly polar and hydrophilic following quaternization, from both SEBS and polyolefin which are both nonpolar. When SEBS is chemically attached to PVBC, it cannot separate any more from PVBC, therefore the compatibilization with polyolefin is preserved after quaternization. While crosslinking allows reducing de-mixing as well, combining crosslinking with grafting was found to be very efficient. Moreover, the resulting graft-copolymer has a reduced capacity to swell in humid environment. It was also found that grafting of SEBS onto PVBC significantly improves the stability of film extrusion process, possibly because branched polymers have better melt strength than linear polymers.

In various embodiments, the cross-linking stage(s) (indicated schematically by numerals 125, 230, 235, 255) may be carried out during the compounding, during the film extrusion and/or in a post-treatment stage. The cross-linking is carried out with respect to at least one of the polymers and/or between at least two of the polymers, for example among molecules of first polymer 110, among molecules of second polymer(s) 120, among molecules of third polymer(s) 130 and/or among any two different types of polymer molecules.

In non-limiting examples, cross-linking with respect to the second and/or third polymers may be carried out during the compounding, e.g., implementing radical-initiated cross-linking (e.g., via the peroxide route) between ethylene and/or propylene and/or butylene units. In non-limiting examples, cross-linking with respect to the first polymer (e.g., forming VBC-VBC bonds by diamines) may be carried out after the extrusion, e.g., by immersion in a bath containing bifunctional tertiary amines.

In various embodiments, cross-linking may be implemented (optionally comprising grafting) between the first polymer and the second and/or third polymer(s), e.g., via amine and/or hydroxyl group(s) on respective second and/or third polymer(s). Possibly, the first polymer may be co-crosslinked with second and/or third polymer(s) in the compounder, possibly via amine and/or hydroxyl group(s) on respective second and/or third polymer(s).

Cross-linking may be carried out with respect to the first, the second and/or the third polymer(s) (when the latter is included) by applying crosslinking compound(s) thereto (stage 235). For example, cross-linking may be carried out with respect to one or more of first polymer 110, second polymer(s) 120, third polymer(s) 130 (when used) and/or between two types of the polymers. The crosslinking stage may be carried out during the compounding, during the extruding and/or in a post-treatment stage—to form an inter-penetrating network of the cross-linked polymer(s).

For example, as illustrated schematically in FIG. 1B, first polymer 110 may be cross-linked (125A) to form the inter-penetrating network through the polymer. In certain embodiments, functionalization 115A may be carried out simultaneously with the cross-linking of the first polymer, e.g., during extrusion.

In certain embodiments, the cross-linking may be applied to second polymer(s) 120 during or after the compounding to form an inter-penetrating network of the cross-linked second polymer. For olefins as second polymer(s) 120, cross-linking may be carried out using peroxide crosslinking compound such as dicumyl peroxide (DCP) or similar, and/or using silanes.

In certain embodiments, when the compounding step includes the third polymer(s), the cross-linking may be carried out by applying at least one crosslinking compound to the respective third polymer(s) (stage 235). Crosslinking compounds may comprise, e.g., a peroxide compound such as dicumyl peroxide (DCP) or similar, and/or a silane. Cross-linking third polymer(s) 130 may be carried out during or after the compounding to form an inter-penetrating network of the cross-linked second polymer.

In another non-limiting example, the cross-linking may be applied to either or both second polymer(s) 120 and third polymer(s) 130 during or after the compounding to form an inter-penetrating network of the cross-linked second polymer that connects molecules of the different types of polymers. In non-limiting embodiments, cross-linking second polymer(s) 120 and/or third polymer(s) 130 may be carried out during and/or after the extrusion stage, while cross-linking first polymer(s) 110 may be carried after the extrusion stage, during or after the functionalization stage. Non-limiting examples include radical-initiated crosslinking (e.g., via the peroxide route) between ethylene and/or propylene and/or butylene units of second polymer(s) 120 and/or third polymer(s) 130 (intra- or inter-polymeric).

In certain embodiments, the cross-linking may be applied to the first polymer during or after the compounding to form an inter-penetrating network of the cross-linked first polymer. In certain embodiments, the cross-linking and the functionalizing may be carried out simultaneously with respect to the first polymer. For example, cross-linking the first polymer may be carried out by cross linking tertiary amines e.g., during, after and/or before the functionalizing, with respect of some of quaternary amine groups that are used to functionalize the membrane (in the same or in a previous functionalization step). For example, crosslinking PVBC as the first polymer may be carried out by cross linking tertiary amines, which may be carried out e.g., during the functionalization step with respect of some of the quaternary amine groups. In non-limiting examples, the molar ratio of difunctional to monofunctional tertiary amines may be between 0-70 mol %, e.g., any of 0, 10 mol %, 20 mol %, 30 mol %, 40 mol %, 50 mol %, 60 mol %, 70 mol % or intermediate values. Non-limiting examples include forming 1-1: VBC-VBC bond by corresponding diamines.

In certain embodiments, second polymer(s) 120 and optionally third polymer(s) 130 may be cross-linked during the compounding and/or during and/or after the extrusion (e.g., adding peroxide) and first polymer 110 may be additionally (optionally) and consecutively be cross-linked using a chemical bath.

In any of the embodiments, the crosslinking and the formation of the inter-penetrating network of one or more of the polymers prevents de-mixing of the polymer materials and maintains the compounding thereof throughout the extrusion process and/or in the produced membrane and during the operation of anion exchange membrane 160. Disclosed crosslinking may also be configured to improve the rigidity and reduce the swelling of the membrane in water or in other solvents.

Membranes 160 may be produced by extrusion (stage 240), e.g., by melting blend pellet 145 and extruding the melt in extruder 150 to yield blend film 155, e.g., by cast extrusion or by blown film extrusion. Blend film 155 may then be rolled for further processing and use. Advantageously, using extrusion enables producing broad and wide membranes, which are typically not achievable in present production processes, especially for alkaline or anion exchange membrane (AEM) devices electrochemical devices. For example, membranes 160 may be produced to have a thickness between 20-500 μm (e.g., any of 20 μm, 50 μm, 100 μm, 200 μm, 300 μm, 500 μm, or intermediate values) and a width between 5 cm and 10 m, or any intermediate dimensions. Moreover, the extrusion may be configured to orient polymer molecules (e.g., of second polymer(s)) to provide strength to membrane 160 (e.g., in plane strength, or directional strength).

Non-limiting examples for disclosed reinforced anion exchange membranes 160 produced by system 100 and/or method 200, may be functionalized to yield membranes 160 for any of: alkaline or AEM electrochemical devices, such as fuel cells, electrolyzers (e.g., $H_2O$ or $CO_2$ electrolyzers), reversible electrochemical devices (that operable alternately as fuel cells and as electrolyzers, e.g., the electrolyzer operation mode producing hydrogen used in the fuel cell operation mode), desalination modules and units (e.g., removing anions such as $OH^-$, $Cl^-$, $HCOO^-$, $C_2O_3^-$, as non-limiting examples, from water passed through the membranes), electrodialysis device(s), synthesizing device(s), e.g., of ammonia or synthetic fuels, etc. Advantageously, disclosed methods may be used to produce large membrane (in both length and width dimensions) that are reinforced and durable in any of these applications.

In various embodiments, functionalization and optionally crosslinking and/or applying electron beam irradiation before the functionalization, the amination and/or the chemical crosslinking (stage 252)—may comprise a quaternization step comprising reacting halogen (halide) groups of the first polymer with tertiary amines to produce quaternary amine groups providing an ion-exchange functionality to the membrane, optionally performing additional cross-linking during the functionalizing (stage 255), optionally purifying the membrane to remove residual reactants and solvents, applying an ion-exchange step by immersing the membrane in a solution of salts (e.g., to replace Cl$^-$ of PVBC as first polymer 110 with, e.g., any of OH$^-$, CO$_3^{2-}$, HCO$_3^-$, F$^-$, Br$^-$, I$^-$, NO$_3^-$, etc.) and drying the membrane (denoted collectively in stage 260). Non limiting examples for tertiary amines include trimethylamine (TMA), methylpyrolidine, methylpiperidine, dimethylbenzylamine, tetramethyl-1,3-propanediamine (TMPDA), tetramethyl-1,4-butanediamine (TMBDA), tetramethyl-1,6-hexanediamine (TMHDA), 4,4'-Trimethylenebis(1-methylpiperidine), 1,4-Diazabicyclo[2.2.2]octane. For example, TMHDA or other bi- or tri-functional tertiary amines may be used to crosslink PVBC as the first polymer. Solvents for the amination and/or associated cross-linking may comprise water, alcohols, acetonitrile, dimethylsulfoxide, propylene carbonate and their mixtures. In various embodiments, alternative or additional functionalization stages such as etherification may be applied to first polymer 110 instead or in addition to quaternization.

Certain embodiments comprise blend pellets 145 formed by the compounding stage 210 of method 200 and/or by compounder 140, and/or blend films 155 formed by the extruding stage 220 of method 200 and/or by extruder 150.

In various embodiments, method 200 of preparing a reinforced anion exchange membrane (stage 205), comprises (i) compounding PVBC (poly(vinylbenzyl chloride)) or a copolymer thereof with at least one thermoplastic polymer and at least one SEBS (styrene-ethylene-butadiene-styrene) and/or modified SEBS—by heating, mixing and cooling—to form blend pellets (stage 210), in which the PVBC or copolymer thereof is cross-linked or grafted with the at least one thermoplastic polymer and/or with the at least one SEBS and/or modified SEBS (stage 230), (ii) extruding the blend pellets to form a blend film (stage 240), and functionalizing the blend film to prepare the anion exchange membrane (stage 252), e.g., by quaternization. In non-limiting examples, the at least one thermoplastic polymer comprises LDPE (low density polyethylene) and/or the at least one SEBS and/or modified SEBS comprises amine-modified SEBS. In non-limiting examples, the functionalizing may comprise amination (e.g., converting chloride groups of the PVBC into quaternary ammonium groups with Cl$^-$ as counterions), crosslinking (e.g., immersion in an ethanolic solution with a cross linker selected to crosslink VBC monomers of the PVBC followed by neutralization of the amines in acidic solution) and ion exchanging (e.g., exchanging at least some of the Cl$^-$ with HCO$_3^-$). Various embodiments comprise blend pellets, blend films as well as reinforced anion exchange membrane produced by the disclosed methods, functionalized to yield a membrane for various types of fuel cells, electrolyzers, reversible electrochemical devices and/or desalination units, especially alkaline or AEM devices. For example, devices may include water treatment devices, electrodialysis devices, various types of electrolysis devices (e.g., of H$_2$O, CO$_2$), various types of synthesizing devices (e.g., of NH$_3$, synthetic fuels such as liquid hydrocarbons, e.g., synthetic aviation fuel), etc. The reinforced anion exchange membranes may have a thickness between 20-500 μm and a width between 5 cm and 10 m, and may have a through-plane HCO$_3$-conductivity of at least 5 mS/cm, 10 mS/cm, 15 mS/cm, 20 mS/cm, 30 mS/cm or intermediate values.

The following includes experimental settings and data illustrating non-limiting examples.

Example 1

A blend of 40 wt % PVBC (Mw=100 kDa) and 60 wt % SEBS (43% styrene) was compounded in a twin-screw extruder. SEBS was fed in a first feeder at 2.6 kg/hr, 38 rpm and PVBC in fed in a second feeder at 1.7 kg/hour, 2.7 rpm. The working parameters were a pressure of 2 bar, a temperature of 200° C. and total output 4.3 kg/h. The blend was water-cooled and pelletized. The pellets were thoroughly dried under increased temperature and vacuum. Then the pellets were processed by blown film extrusion. The working parameters were a melt temperature of 200° C., a melt pressure of 43 bar and an output of 2.2 kg/hour. The obtained film had a thickness of 110 μm and a lay flat width of 120 mm. The film was then aminated and crosslinked by immersion into an ethanolic solution of TMA and N,N,N',N'-Tetramethyl-1,6-hexanediamine (TMHDA) for 72 hours, with total molarity of 3 M and a molar ratio of TMA to TMHDA of 2:1. The chloride groups of PVBC were converted into quaternary ammonium groups with Cl$^-$ as counterions. TMHDA created crosslinks between VBC monomers. The membrane was then immersed in 1 M sulfuric acid to neutralize the amines and was rinsed multiple time in deionized water. Then, the membrane was ion-exchanged to HCO$_3^-$ by triple immersion in 1 M solution of potassium hydrogen carbonate followed by multiple rinsing in DI water. Finally, the membrane was dried at 60° C. under vacuum. The membrane was tested to have a through-plane HCO$_3$— conductivity of 15 mS/cm with hydrogen carbonate counterions, at 80° C. and 95% RH.

Example 2

A blend of 50 wt % PVBC (Mw=100 kDa), 10 wt % SEBS (20 wt % styrene) and 40 wt % LDPE (melt flow index of 0.7 g/10 min, ISO 1133) was compounded in a twin-screw extruder. SEBS and LDPE pellets were introduced together in a first feeder at 2.9 kg/hr, 38 rpm and PVBC was fed in a second feeder at 2.9 kg/hr, 2.7 rpm. The working parameters were a pressure of 2 bar, a temperature of 200° C. and total output of 5.8 kg/hr. The blend was water-cooled and pelletized. The pellets were thoroughly dried under increased temperature and vacuum. Then the pellets were processed by blown film extrusion. The working parameters were a melt temperature of 267° C., melt pressure of 10 bar and an output of 2.1 kg/hr. The obtained film thickness had a thickness of 85 μm and a lay flat width of 140 mm. Pieces of the film were hot-pressed at 120° C. for 8 min under 20 MPa pressure in order to relax internal stresses. The film was then aminated and crosslinked by immersion into an ethanolic solution of TMA and TMHDA for 72 hours, with total molarity of 3 M and a molar ratio of TMA to TMHDA of 2:1. The chloride groups of PVBC were converted into quaternary ammonium groups with Cl$^-$ as counterions. TMHDA created crosslinks between VBC monomers. The membrane was then immersed in 1 M sulfuric acid to neutralize the amines and was rinsed multiple time in deionized water. Then, the membrane was ion-exchanged to HCO$_3$ by triple immersion in 1 M solution of potassium hydrogen carbonate followed by multiple rinsing in DI water. Finally, the membrane was dried at 60° C. under vacuum. The membrane was tested to have a through-plane $HCO_3$-conductivity of 12 mS/cm with hydrogen carbonate counterion, at 80° C. and 95% RH.

Example 3

A blend of 40 wt % PVBC (Mw=50 kDa), 10 wt % amine-modified SEBS (30 wt % styrene) and 40 wt % LDPE (melt flow index of 0.7 g/10 min, ISO 1133) was compounded in a twin-screw extruder. SEBS and LDPE pellets were introduced together in a first feeder at 2.7 kg/hr, 35 rpm and PVBC was fed in a second feeder at 1.7 kg/hr, 2.8 rpm. The working parameters were a pressure of 4 bar, a temperature of 200° C. and a total output of 4.5 kg/hr. The amine-containing SEBS reacted with the PVBC during the process to give a SEBS-grafted PVBC possibly leading to light crosslinking between those polymers. Without being bound to theory, this may have been evidenced by increased torque during the compounding process as a result of the increase of melt viscosity and by small amount of HCl that were release by the reaction. The blend was water cooled and pelletized. The pellets were thoroughly dried under increased temperature and vacuum. Then the pellets were processed by blown film extrusion. The working parameters were a melt temperature of 215° C., a melt pressure of 63 bar and an output of 2.1 kg/hr. The obtained film thickness had a thickness of 60 µm and a lay flat width of 120 mm. Pieces of the film were hot-pressed at 120° C. for 8 min under 20 MPa pressure in order to relax internal stresses. The film was then aminated and crosslinked by immersion into an ethanolic solution of TMA and TMHDA for 72 hours, with total molarity of 3 M and a molar ratio of TMA to TMHDA of 9:1. The chloride groups of PVBC were converted into quaternary ammonium groups with $Cl^-$ as counterion. TMHDA created crosslinks between VBC monomers. The membrane was then immersed in 1 M sulfuric acid to neutralized the amines and rinsed multiple times in deionized water. Then, the membrane was ion-exchanged to $HCO_3$— by triple immersion in 1 M solution of potassium hydrogen carbonate followed by multiple rinsing in DI water. Finally, the membrane was dried at 60° C. under vacuum. The membrane showed a through-plane $HCO_3$-conductivity of 10 mS/cm with hydrogen carbonate counterion, at 80° C. and 95% RH.

Advantageously, disclosed methods 200 that include extrusion are unexpected in view of common anion-exchange membrane production processes such as wet (solvent-based) processes (e.g., roll coating etc.) because in the common practice the polymers are functionalized before being processed and degrade under applied heat above 120-150° C. as disclosed herein, and because even prior to functionalization, polymers used in common practice are not and cannot be processed in melt processes. In contrast, disclosed methods 200 include polymer components that can be processed in melt processes and include post-functionalization of the already-processed membranes. The inventors note that even though PVBC is used for membranes, it is not considered as processable in melt in the prior art. However, as disclosed herein, compounding PVBC or other functionalized polymers enables their processing in melt form.

Advantageously, while reinforcement of anion-exchange membranes in common practice is achieved in wet processes by infusing the polymers or monomers into a pre-made strong polymeric mesh (which is a very delicate and expensive process), disclosed methods 200 include reinforcing the membranes by creating a mesh structure by orienting some of the second polymer molecules (e.g., polyolefins) during extrusion to produce the mesh "in-situ", hence reinforcing significantly the membrane in a simple and cheap way.

Advantageously, compared to the radiation grafting technology described in Wang et al. 2019, disclosed methods are much simpler and much less expensive, and therefore more appropriate for industrial use and mass production. Moreover, disclosed anion exchange membranes (AEM) for alkaline electrode assemblies are fundamentally different in composition and performance requirements from proton exchange membranes (PEM) taught by Mokrini et al. 2008. Advantageously, by grafting polymers rather than polymerizing VBC into PVBC on polyethylene-disclosed embodiments may reach a lower cost for currently available membranes and enable production of membranes that have a large size and produced at very high production volumes/rates due to the use of extrusion processes. It is further noted that Mokrini et al. 2008 uses polymer blends that include modified styrene-(ethylene-butylene)-styrene block copolymer (SEBS) and polyvinylidene fluoride (PVDF), in contrast to present embodiments using include a halide-functionalized polymer, in which the halogen may be chlorine, bromine or iodine, and not fluorine, and which is functionalized to form cationic quaternary amine groups to enable anion exchange.

Moreover, disclosed production methods may be implemented to utilize common commercial polymers, avoiding current needs to polymerize monomers, and enabling reliable and reproduceable production with a secured chain supply. Specifically, disclosed embodiments enable using polyolefins (e.g., polyethylene—PE, polypropylene—PP and their derivatives) as the second polymer(s) which are easy to process and may be used to provide reinforcement and swelling reduction. It is noted that in current technology polyolefins are not usable because they are not soluble under reasonable conditions and therefore cannot be used in wet process. In contrast, disclosed methods 200 implements extrusion to produce the membrane and thereby allows the introduction of a variety of polymers and not requiring a common solvent for all the blended constituents as in the prior art.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of preparing a reinforced anion exchange membrane, the method comprising:
compounding a first polymer with at least one second polymer and at least one third polymer by heating, mixing and cooling-to form blend pellets,
extruding the blend pellets to form a blend film, wherein the first polymer is optionally grafted with the at least one second polymer or the at least one third polymer during the extrusion,
cross-linking at least one of the polymers during the compounding and/or during the extrusion and/or after the extrusion, and
functionalizing the blend film to prepare the anion exchange membrane,
wherein:
the first polymer comprises a halide-functionalized polymer selected to react with amines to yield anion-conducting quaternary amine groups, wherein the halogen is chlorine, bromine or iodine, and not fluorine,
the functionalizing comprises a quaternization step comprising reacting halogen groups of the first polymer with tertiary amines to produce quaternary amine groups providing an ion-exchange functionality to the membrane,
the at least one second polymer comprises at least one thermoplastic polymer selected to support and/or reinforce the membrane, and
the at least one third polymer comprises a copolymer selected to enhance the compounding of the first polymer and the at least one second polymer,
wherein the cross-linking is carried out by applying at least one crosslinking compound comprising a peroxide compound and/or a silane to the at least one third polymer.

2. The method of claim 1, wherein the first polymer comprises PVBC (poly (vinylbenzyl chloride)) or a copolymer thereof, the at least one second polymer comprises at least one polyolefin, the at least one third polymer comprises at least one of: SEBS (styrene-ethylene-butadiene-styrene), SEPS (styrene-ethylene-propylene-styrene), SBS (poly (styrene-butadiene-styrene) and/or modified SEBS, SEPS or SBS, and the compounding is carried out within a temperature range of 120-350° C.

3. A method of preparing a reinforced anion exchange membrane, the method comprising:
compounding a first polymer with at least one second polymer and at least one third polymer by heating, mixing and cooling-to form blend pellets,
extruding the blend pellets to form a blend film, wherein the first polymer is optionally grafted with the at least one second polymer or the at least one third polymer during the extrusion,
cross-linking at least one of the polymers during the compounding and/or during the extrusion and/or after the extrusion, and
functionalizing the blend film to prepare the anion exchange membrane,
wherein:
the first polymer comprises a halide-functionalized polymer selected to react with amines to yield anion-conducting quaternary amine groups, wherein the halogen is chlorine, bromine or iodine, and not fluorine,
the functionalizing comprises a quaternization step comprising reacting halogen groups of the first polymer with tertiary amines to produce quaternary amine groups providing an ion-exchange functionality to the membrane,
the at least one second polymer comprises at least one thermoplastic polymer selected to support and/or reinforce the membrane, and
the at least one third polymer comprises a copolymer selected to enhance the compounding of the first polymer and the at least one second polymer,
wherein the cross-linking is applied to the first polymer during or after the compounding to form an interpenetrating network of the cross-linked first polymer by cross linking with tertiary amines during the functionalizing, with respect to some of the quaternary amine groups of the first polymer.

4. A method of preparing a reinforced anion exchange membrane, the method comprising:
compounding a first polymer with at least one second polymer and at least one third polymer by heating, mixing and cooling-to form blend pellets,
extruding the blend pellets to form a blend film, wherein the first polymer is optionally grafted with the at least one second polymer or the at least one third polymer during the extrusion,
cross-linking at least one of the polymers during the compounding and/or during the extrusion and/or after the extrusion, and
functionalizing the blend film to prepare the anion exchange membrane,
wherein:
the first polymer comprises a halide-functionalized polymer selected to react with amines to yield anion-conducting quaternary amine groups, wherein the halogen is chlorine, bromine or iodine, and not fluorine,
the functionalizing comprises a quaternization step comprising reacting halogen groups of the first polymer with tertiary amines to produce quaternary amine groups providing an ion-exchange functionality to the membrane,
the at least one second polymer comprises at least one thermoplastic polymer selected to support and/or reinforce the membrane, and
the at least one third polymer comprises a copolymer selected to enhance the compounding of the first polymer and the at least one second polymer,
wherein the cross-linking and the functionalizing are carried out simultaneously with respect to the first polymer.

5. The method of claim 1, wherein the extruding of the blend pellets to form a blend film includes cast extrusion or blown film extrusion.

6. The method of claim 1, further comprising:
optionally applying electron beam irradiation before the functionalizing,
optionally performing additional cross-linking during the functionalizing,
purifying the membrane to remove residual reactants and solvents, applying an ion-exchange step by immersing the membrane in a solution of salts, and drying the membrane.

7. The method of claim 1, wherein the extruding is configured to orient the at least second polymer to provide strength to the membrane.

8. A reinforced anion exchange membrane produced by:

compounding a first polymer with at least one second polymer and at least one third polymer by heating, mixing and cooling to form blend pellets, extruding the blend pellets to form a blend film, wherein the first polymer is optionally grafted with the at least one second polymer or the at least one third polymer during the extrusion, cross-linking at least one of the polymers during the compounding and/or during the extrusion and/or after the extrusion, and functionalizing the blend film to prepare the anion exchange membrane, wherein:

the first polymer comprises a halide-functionalized polymer selected to react with amines to yield anion-conducting quaternary amine groups, wherein the halogen is chlorine, bromine or iodine, and not fluorine, the functionalizing comprises a quaternization step comprising reacting halogen groups of the first polymer with tertiary amines to produce quaternary amine groups providing an ion-exchange functionality to the membrane, the at least one second polymer comprises at least one thermoplastic polymer selected to support and/or reinforce the membrane, and the at least one third polymer comprises a copolymer selected to enhance the compounding of the first polymer and the at least one second polymer; and wherein the reinforced anion exchange membrane is functionalized to yield a membrane for at least one of: a fuel cell, an electrolyzer, a reversible electrochemical device and a desalination unit.

9. The reinforced anion exchange membrane of claim 8, having a thickness between 20-500 μm.

10. Blend pellets formed by compounding a first polymer with at least one second polymer and at least one third polymer by heating, mixing and cooling, wherein the first polymer comprises a halide-functionalized polymer selected to react with amines to yield anion-conducting quaternary amine groups, wherein the halogen is chlorine, bromine or iodine, and not fluorine, the at least one second polymer comprises at least one thermoplastic polymer selected to support and/or reinforce the membrane, the at least one third polymer comprises a copolymer that enhances the compounding of the first polymer and the at least one second polymer, and at least one of the polymers is cross-linked by applying at least one crosslinking compound comprising a peroxide compound and/or a silane to the at least one third polymer.

11. A blend film formed by extruding blend pellets formed by compounding a first polymer with at least one second polymer and at least one third polymer by heating, mixing and cooling, wherein the first polymer is optionally grafted with the at least one second polymer or the at least one third polymer during the extrusion, and wherein the blend film comprises the compounded first polymer with the at least one second polymer and the at least one third polymer, the first polymer comprises a halide-functionalized polymer selected to react with amines to yield anion-conducting quaternary amine groups, wherein the halogen is chlorine, bromine or iodine, and not fluorine, the at least one second polymer comprises at least one thermoplastic polymer selected to support and/or reinforce the membrane, the at least one third polymer comprises a copolymer selected to enhance the compounding of the first polymer and the at least one second polymer, the blend film is functionalized to prepare the anion exchange membrane, the functionalizing comprises a quaternization step comprising reacting halogen groups of the first polymer with tertiary amines to produce quaternary amine groups providing an ion-exchange functionality to the membrane, and at least one of the polymers is cross-linked by applying at least one crosslinking compound comprising a peroxide compound and/or a silane to the at least one third polymer.

12. A method of preparing a reinforced anion exchange membrane, the method comprising:

compounding PVBC (poly (vinylbenzyl chloride)) or a copolymer thereof with at least one thermoplastic polymer and at least one SEBS (styrene-ethylene-butadiene-styrene) and/or modified SEBS—by heating, mixing and cooling—to form blend pellets, extruding the blend pellets to form a blend film, wherein the PVBC or copolymer thereof is grafted with the at least one SEBS and/or modified SEBS during the extrusion, cross-linking the PVBC or copolymer thereof with the at least one thermoplastic polymer during the compounding and/or during the extrusion and/or after the extrusion, and functionalizing the blend film to prepare the anion exchange membrane, wherein the at least one thermoplastic polymer and/or the at least one SEBS and/or modified SEBS polymer are reactive, and configured to react with the PVBC during the compounding.

13. A method of preparing a reinforced anion exchange membrane, the method comprising:

compounding PVBC (poly (vinylbenzyl chloride)) or a copolymer thereof with at least one thermoplastic polymer and at least one SEBS (styrene-ethylene-butadiene-styrene) and/or modified SEBS-by heating, mixing and cooling-to form blend pellets, extruding the blend pellets to form a blend film, wherein the PVBC or copolymer thereof is grafted with the at least one SEBS and/or modified SEBS during the extrusion, cross-linking the PVBC or copolymer thereof with the at least one thermoplastic polymer during the compounding and/or during the extrusion and/or after the extrusion, and functionalizing the blend film to prepare the anion exchange membrane, wherein the at least one thermoplastic polymer comprises HDPE (high density polyethylene), LDPE (low density polyethylene), or polypropylene.

14. A method of preparing a reinforced anion exchange membrane, the method comprising:

compounding PVBC (poly (vinylbenzyl chloride)) or a copolymer thereof with at least one thermoplastic polymer and at least one SEBS (styrene-ethylene-butadiene-styrene) and/or modified SEBS-by heating, mixing and cooling-to form blend pellets, extruding the blend pellets to form a blend film, wherein the PVBC or copolymer thereof is grafted with the at least one SEBS and/or modified SEBS during the extrusion, cross-linking the PVBC or copolymer thereof with the at least one thermoplastic polymer during the compounding and/or during the extrusion and/or after the extrusion, and functionalizing the blend film to prepare the anion exchange membrane, wherein the at least one SEBS and/or modified SEBS comprises amine-modified SEBS.

15. A method of preparing a reinforced anion exchange membrane, the method comprising:

compounding PVBC (poly (vinylbenzyl chloride)) or a copolymer thereof with at least one thermoplastic polymer and at least one SEBS (styrene-ethylene-butadiene-styrene) and/or modified SEBS-by heating, mixing and cooling to form blend pellets, extruding the blend pellets to form a blend film, wherein the PVBC or copolymer thereof is grafted with the at least one SEBS and/or modified SEBS during the extrusion, cross-linking the PVBC or copolymer thereof with the at least one thermoplastic polymer during the compounding and/or during the extrusion and/or after the extrusion, and functionalizing the blend film to prepare the anion exchange membrane, wherein the functionalizing comprises optionally applying electron beam irradiation, amination, crosslinking and ion exchanging, and wherein the amination comprises converting chloride groups of the PVBC into quaternary ammonium groups with $Cl^-$ as counterions, the crosslinking comprises immersion in an ethanolic solution with a cross linker selected to crosslink VBC monomers of the PVBC followed by neutralization of the amines in acidic solution, and the ion exchanging comprises exchanging at least some of the $Cl^-$ with $HCO_3^-$.

16. A reinforced anion exchange membrane produced by the method of claim 12, having a thickness between 20-500 μm, a through-plane $HCO_3-$ conductivity of at least 10 mS/cm, and functionalized to yield a membrane for at least one of: a fuel cell, an electrolyzer, a reversible electrochemical device, a desalination unit.

17. Blend pellets according to claim 10, wherein:

the blend pellets comprise compounded PVBC or a copolymer thereof with at least one thermoplastic polymer and at least one SEBS and/or modified SEBS, wherein the at least one thermoplastic polymer and/or the at least one SEBS and/or modified SEBS polymer are reactive, and configured to react with the PVBC during the compounding.

18. A blend film according to claim 11, wherein:

the blend film comprises the compounded PVBC or the copolymer thereof with the at least one thermoplastic polymer and the at least one SEBS and/or modified SEBS, the PVBC or copolymer thereof is grafted with the at least one SEBS and/or modified SEBS, the PVBC or copolymer thereof is cross-linked with the at least one thermoplastic polymer, the blend film is functionalized to prepare the anion exchange membrane, and wherein the at least one thermoplastic polymer and/or the at least one SEBS and/or modified SEBS polymer are reactive, and configured to react with the PVBC during the compounding.

19. The method of claim 3, wherein the first polymer comprises PVBC (poly (vinylbenzyl chloride)) or a copolymer thereof, the at least one second polymer comprises at least one polyolefin, the at least one third polymer comprises at least one of: SEBS (styrene-ethylene-butadiene-styrene), SEPS (styrene-ethylene-propylene-styrene), SBS (poly (styrene-butadiene-styrene) and/or modified SEBS, SEPS or SBS, and the compounding is carried out within a temperature range of 120-350° C.

20. The method of claim 3, wherein the extruding of the blend pellets to form a blend film includes cast extrusion or blown film extrusion.

21. The method of claim 3, further comprising:

optionally applying electron beam irradiation before the functionalizing, optionally performing additional cross-linking during the functionalizing, purifying the membrane to remove residual reactants and solvents, applying an ion-exchange step by immersing the membrane in a solution of salts, and drying the membrane.

22. The method of claim 3, wherein the extruding orients at least the second polymer to provide strength to the membrane.

23. The method of claim 4, wherein the first polymer comprises PVBC (poly (vinylbenzyl chloride)) or a copolymer thereof, the at least one second polymer comprises at least one polyolefin, the at least one third polymer comprises at least one of: SEBS (styrene-ethylene-butadiene-styrene), SEPS (styrene-ethylene-propylene-styrene), SBS (poly (styrene-butadiene-styrene) and/or modified SEBS, SEPS or SBS, and the compounding is carried out within a temperature range of 120-350° C.

24. The method of claim 4, wherein the extruding of the blend pellets to form a blend film includes cast extrusion or blown film extrusion.

25. The method of claim 4, further comprising:

optionally applying electron beam irradiation before the functionalizing, optionally performing additional cross-linking during the functionalizing, purifying the membrane to remove residual reactants and solvents, applying an ion-exchange step by immersing the membrane in a solution of salts, and drying the membrane.

26. The method of claim 4, wherein the extruding is configured to orient the at least second polymer to provide strength to the membrane.

27. The reinforced anion exchange membrane of claim 8, wherein the first polymer comprises PVBC (poly (vinylbenzyl chloride)) or a copolymer thereof, the at least one second polymer comprises at least one polyolefin, the at least one third polymer comprises at least one of: SEBS (styrene-ethylene-butadiene-styrene), SEPS (styrene-ethylene-propylene-styrene), SBS (poly (styrene-butadiene-styrene) and/or modified SEBS, SEPS or SBS, and the compounding is carried out within a temperature range of 120-350° C.

28. The reinforced anion exchange membrane of claim 8, wherein the extruding of the blend pellets to form a blend film includes cast extrusion or blown film extrusion.

29. The reinforced anion exchange membrane of claim 8, wherein the method further comprises:
  optionally applying electron beam irradiation before the functionalizing,
  optionally performing additional cross-linking during the functionalizing,
  purifying the membrane to remove residual reactants and solvents,
  applying an ion-exchange step by immersing the membrane in a solution of salts, and
  drying the membrane.

30. The reinforced anion exchange membrane of claim 8, wherein the extruding is configured to orient at least the second polymer to provide strength to the membrane.

31. Blend pellets according to claim 17, wherein the blend pellets comprise the compounded PVBC or the copolymer thereof with the at least one thermoplastic polymer and the at least one SEBS and/or modified SEBS by heating, mixing and cooling, and wherein the at least one thermoplastic polymer comprises HDPE (high density polyethylene), LDPE (low density polyethylene), or polypropylene.

32. A blend film according to claim 18, wherein:
  the blend film comprises the compounded PVBC or the copolymer thereof with the at least one thermoplastic polymer and the at least one SEBS and/or modified SEBS,
  the PVBC or copolymer thereof is grafted with the at least one SEBS and/or modified SEBS,
  the PVBC or copolymer thereof is cross-linked with the at least one thermoplastic polymer,
  the blend film is functionalized to prepare the anion exchange membrane, and
  the at least one thermoplastic polymer comprises HDPE (high density polyethylene), LDPE (low density polyethylene), or polypropylene.

33. Blend pellets according to claim 10, wherein the blend pellets comprise the compounded PVBC or the copolymer thereof with the at least one thermoplastic polymer and the at least one SEBS and/or modified SEBS by heating, mixing and cooling, and wherein the at least one SEBS and/or modified SEBS comprises amine-modified SEBS.

34. A blend film according to claim 11, wherein:
  the blend film comprises the compounded PVBC or the copolymer thereof with the at least one thermoplastic polymer and the at least one SEBS and/or modified SEBS-by heating,
  the PVBC or copolymer thereof is grafted with the at least one SEBS and/or modified SEBS,
  the PVBC or copolymer thereof is cross-linked with the at least one thermoplastic polymer, and
  the blend film is functionalized to prepare the anion exchange membrane,
  wherein the at least one SEBS and/or modified SEBS comprises amine-modified SEBS.

35. A blend film according to claim 11, wherein:
  the blend film comprises the compounded PVBC or the copolymer thereof with the at least one thermoplastic polymer and the at least one SEBS and/or modified SEBS-by heating,
  the PVBC or copolymer thereof is grafted with the at least one SEBS and/or modified SEBS,
  the PVBC or copolymer thereof is cross-linked with the at least one thermoplastic polymer,
  the blend film is functionalized to prepare the anion exchange membrane, and
  wherein the functionalizing comprises optionally applying electron beam irradiation, amination, crosslinking and ion exchanging, and wherein the amination comprises converting chloride groups of the PVBC into quaternary ammonium groups with $Cl^-$ as counterions, the crosslinking comprises immersion in an ethanolic solution with a cross linker selected to crosslink VBC monomers of the PVBC followed by neutralization of the amines in acidic solution, and the ion exchanging comprises exchanging at least some of the $Cl^-$ with $HCO_3^-$.

* * * * *